United States Patent [19]

McLagan et al.

[11] 4,148,011
[45] Apr. 3, 1979

[54] ASYNCHRONOUS PRIORITY CIRCUIT FOR CONTROLLING ACCESS TO A BUS

[75] Inventors: Angus McLagan, Newport Beach; Kirk B. Cummings, Whittier, both of Calif.

[73] Assignee: General Automation, Inc., Anaheim, Calif.

[21] Appl. No.: 803,448

[22] Filed: Jun. 6, 1977

[51] Int. Cl.² .................. G05B 23/00; G06F 9/00; H04Q 3/00
[52] U.S. Cl. .................. 340/147 LP; 340/147 SY; 364/900
[58] Field of Search ...... 340/147 R, 147 LP, 147 SY; 364/900

[56] References Cited

U.S. PATENT DOCUMENTS

| | | | |
|---|---|---|---|
| 3,699,529 | 10/1972 | Beyers et al. | 445/1 |
| 3,796,992 | 3/1974 | Nakamura et al. | 340/147 LP |
| 3,832,689 | 8/1974 | Means et al. | 340/147 LP |
| 4,016,539 | 4/1977 | Nanya | 340/147 LP |

*Primary Examiner*—Donald J. Yusko
*Attorney, Agent, or Firm*—Christie, Parker & Hale

[57] ABSTRACT

A priority arbitration circuit for resolving priority between a plurality of master devices which compete for access to one or more slave devices over a common bus. All master devices share a common Request line and a common Busy line. Priority is passed along serially from one device to another in sequence until all pending requests have been serviced, after which priority reverts to an initial device. The first device to issue a request gains priority. Simultaneous requests are resolved in the order in which the devices are connected in the priority chain. A device having a local request and receiving priority on the priority chain sets the Busy signal to lock out all other devices.

4 Claims, 2 Drawing Figures

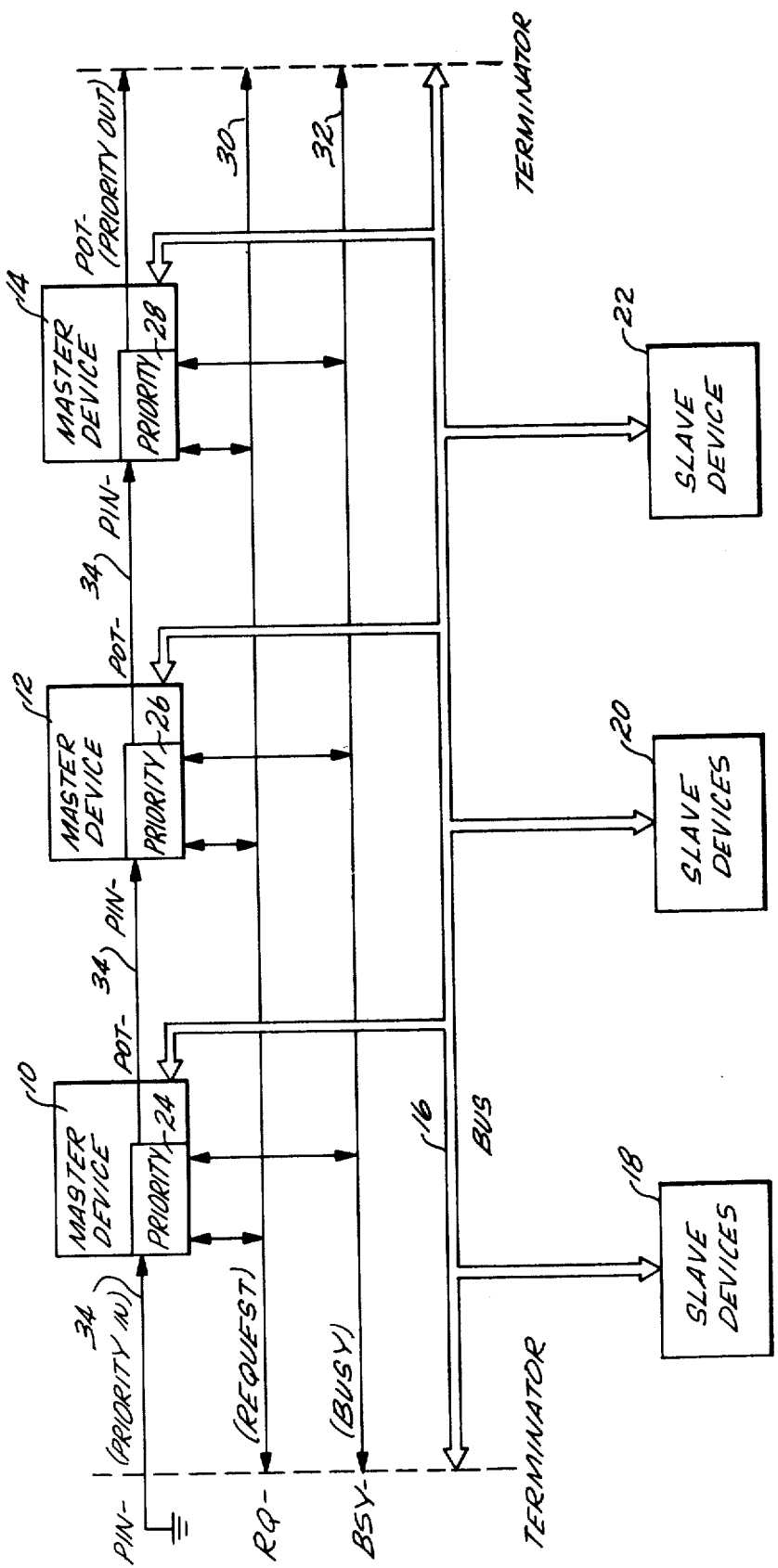

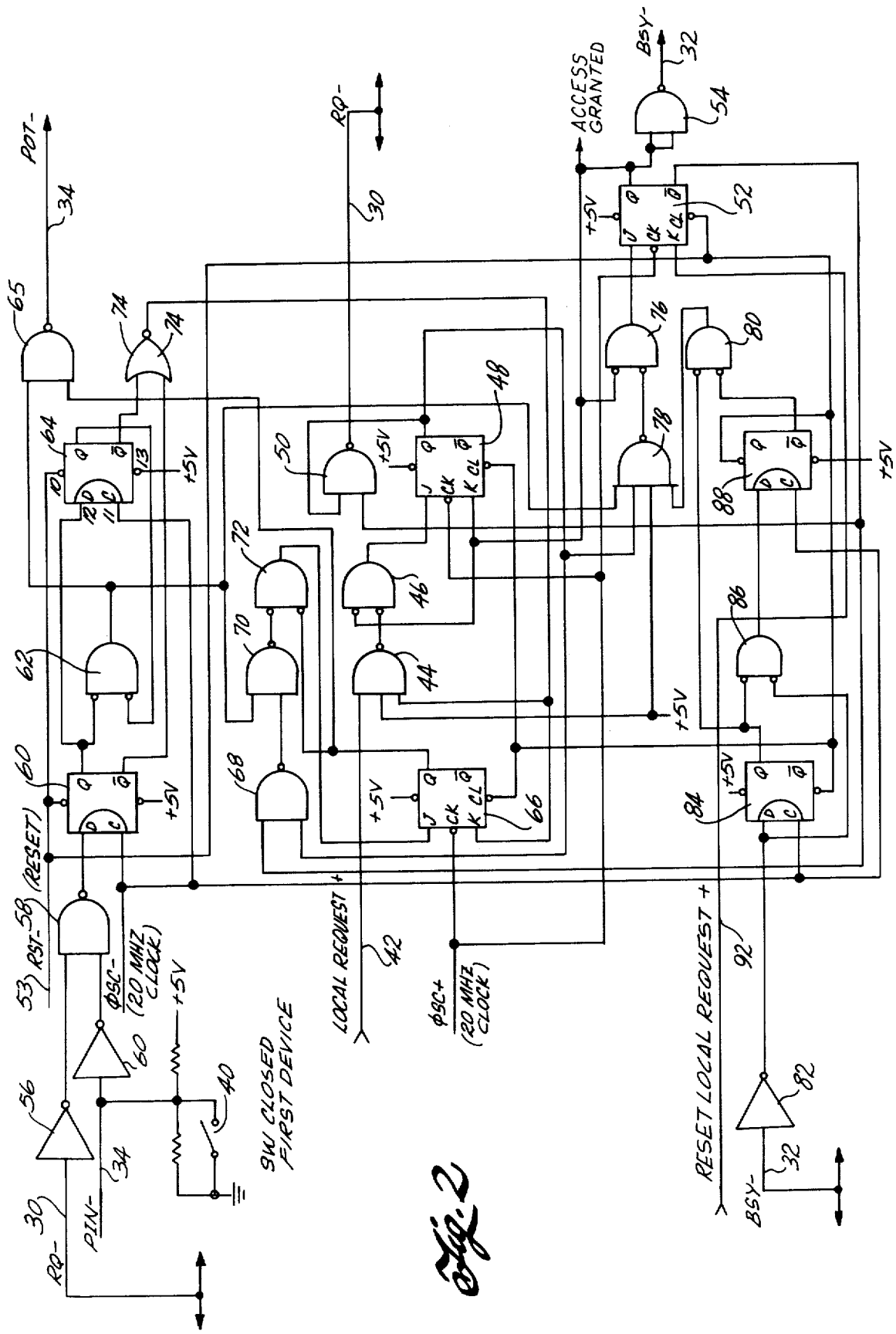

ASYNCHRONOUS PRIORITY CIRCUIT FOR CONTROLLING ACCESS TO A BUS

FIELD OF THE INVENTION

This invention relates to digital computer systems, and more particularly, is concerned with a priority circuit for resolving priority among a number of master stations competing for use of a common data bus.

BACKGROUND OF THE INVENTION

It is well known to utilize a multiplex digital data transfer bus to transfer data between a plurality of digital devices where any one of several of the devices can acquire use of the bus to the temporary exclusion of the other devices. Various priority assigning circuits have been devised to determine in which order competing devices will be assigned to the multiplexed bus. Some devices use a central priority control for assigning priority in a predetermined fixed order. Generally such circuits assign priority on a first come, first serve basis with a fixed sequential order being provided for resolving simultaneous requests. In one prior art scheme, a pulse is propagated along a line serially connecting all of the devices in a closed loop. As the pulse is propagated into and out of each of the devices in sequence, that device is given priority. Once the pulse reaches a device which is requesting access to the bus, propagation of the pulse is interrupted until the access is completed. In the closed loop system, initial conditions become a problem to avoid having more than one device receiving and passing along priority at the same time. In other systems priority pulses are issued by a central control. If the pulse is initiated from a central control, a fixed time must be allowed corresponding to the worst case for a priority pulse to arrive at the most distant device before another priority pulse is initiated. Therefore propagation time and the relative location of the devices becomes an important factor.

SUMMARY OF THE INVENTION

The present invention is directed to an improved priority resolving circuit in which the control logic is distributed between the various competing devices. The distributed logic circuits are connected to a common Request line and common Busy line, but pass priority from one device to the next in a serial or chain connection. The priority circuit does not require any knowledge of the time relationships between different devices on the bus since it does not have a central controller. Each device uses its own local oscillator to synchronize the external priority signal with its internal logic. Any noise on the connecting lines is rejected.

In brief, the present invention provides a modular priority circuit in which identical priority circuits in each device operate asynchronously from their own local clock. Each circuit responds to and applies voltage binary coded levels on each of two common lines, a Request line and a Busy line. One device is permanently assigned priority. A priority signal is transferred serially from circuit to circuit over a Priority line whenever one or more of the circuits signals a request on the Request line. The serial transfer of priority is interrupted at the first circuit in sequence along the Priority line having a local request present until the Busy line signals that the bus is not busy. The circuit that interrupted the priority transfer then seizes the bus, signals a busy status on the Busy line and passes priority on to the next device in sequence. It also removes its own request signal from the Request line. If, and only if, another device in the sequence has initiated a request signal on the Request line, the priority signal is passed along sequentially to the next device having a request pending, where priority remains until the Busy line signals the bus is free and the bus can be seized.

DESCRIPTION OF THE DRAWINGS

For a more complete understanding of the invention, reference should be made to the accompanying drawings wherein:

FIG. 1 is a functional block diagram of the asynchronous priority control; and

FIG. 2 is a schematic block diagram of the priority logic circuit in one of the master devices.

DETAILED DESCRIPTION

Referring to FIG. 1, there is shown a typical system incorporating the features of the present invention which includes two or more master devices, three of which are indicated at 10, 12 and 14. Each master device is arranged to communicate over a common bus 16 with one or more slave devices, three of which are indicated at 18, 20, and 22. The master devices, for example, may be processors or I/O control units or the like, which are capable of initiating data communications over the bus 16. The slave devices may be memory modules, for example, which can be addressed from the master devices to provide a transfer of data over the bus 16. The bus 16 typically includes a plurality of lines for transferring a plurality of binary coded signals in parallel. The signals may represent data and/or addresses. In addition, a plurality of control lines may be provided for transferring control signals between the master devices and the slave devices.

Asynchronous priority arrangement of the present invention includes identical priority resolution circuits in each of the master devices, as indicated respectively at 24, 26, and 28. Each priority circuit is connected to two common control lines 30 and 32 for signaling respectively a Request (RQ-) and signaling that the bus is Busy (BSY-). In addition, the priority circuits are connected serially in a chain by lines 34 which signal priority (PIN- and POT-) into and out of each circuit. The bus and control lines are terminated at each end by termination impedances which allow the levels of the lines to change between two levels, ground and a positive potential. The termination of the lines prevents reflections which could set up noise on the lines. By grounding the priority line 34 at the input to the first priority circuit 24, priority is initially assigned to the first master device 10 in the chain.

Operation of the priority circuits can best be understood by reference to the schematic diagram of FIG. 2. The symbols used in FIG. 2 are conventional positive logic symbols for NAND and NOR gates, latch and JK type flip-flops. However, the control lines RQ-, BSY-, PIN-, and POT- use negative logic in which the signaled condition is true when the line is in a ground state and false when it is in a positive state.

Consider first the operation of the priority logic circuit of FIG. 2 in a standby condition with none of the master devices having initiated a local request to the associated priority circuit. In all but the priority circuit associated with the first device in the chain, the priority in level (PIN-) is false (positive), indicating that all but the first device does not have priority. In the first device in the chain, a switch 40 is closed, tying the priority line 34 to ground at the input to the first device. Thus only the first master device 10 in the chain initially has priority. When any one of the master devices wants access to the bus 16, control logic (not shown) within the master device applies a positive level on a local request input line 42 to the associated priority circuit. Line 42 is applied to one input of a NAND gate 44. The other inputs to the NAND gate 44 are initially positive (binary 1). The presence of the local request causes the output of the NAND gate 44 to change from 1 to 0. The output is applied to one input of a NOR gate 46, the output of which is applied to the J input of a flip-flop 48. As a result of the local request going positive at 42, the J input is set to 1, causing the flip-flop to be set by the next clock pulse from a local 20 MHZ clock which is asynchronous with similar clocks in all the other master devices.

The flip-flop 48 controls one input of a NAND gate 50, the output of which is connected to the request line RQ- going to all the devices. The setting of the flip-flop 48 causes the output of the NAND gate 50 to go from 1 to 0, signaling over the line RQ- that a request has been initiated.

It should be noted that the second input to the NAND gate 50 is derived from the reset level of a second JK flip-flop 52. Both the flip-flops 48 and 52 are initially reset by a negative pulse on a reset line RST- which is applied to the priority circuit at the time the system is turned on. The set level from the flip-flop 52 is applied to a NAND gate 54 which functions as an inverter to initially apply a positive level on to the control line BSY- going to all the priority circuits. This signals that the bus is not being accessed by that device. The set level of the flip-flop 52 is used to signal the local master device that it is granted access to the bus 16.

The RQ- line 30 is connected as an input to each priority circuit through a driver inverter 56 to one input of a NAND gate 58. The PIN- line 34 is applied through a second driver inverter circuit 60 to the second input of the NAND gate 58. If in a particular device, the output of both inverters are 1, indicating the device has received priority and a request is pending, the output of the NAND gate 58 causes a latch circuit 60 to be reset. The latch is originally set by the pulse on the RST- line 53. When the latch 60 is reset it changes one input to a NAND gate 62 from a 1 to a 0 and also resets a second latch 64, the output of which changes the other input to the NAND gate 62 from a 1 to a 0. It should be noted that the latches are reset in response to successive clock pulses from the 20 megahertz clock, thereby producing a one clock delay between the changing of the respective inputs to the NAND gate 62. The output of the NAND gate 62 is applied as one input to a second NAND gate 65, the output of which is connected to the POT- line 34 going to the next device. It will be seen that with both the latches 60 and 64 in their set state, the output of the NAND gate 65 is positive, indicating that the priority into the next device is false. Only when both latches 60 and 64 are reset in response to the RQ- and PIN- lines going true does the output of the NAND gate 65 go to 0, indicating that the POT- line is now true. Thus priority is passed along from the input to the device to the output of the device whenever the RQ- line indicates a request has been initiated by one of the devices. In this manner, once a request has been made by one of the devices, priority is passed along from one device to the next starting with the first device in which the switch 40 is closed with a minimum of one clock pulse interval delay in each device. The delay insures that noise on either the RQ- or PIN- lines will not cause POT- to go true. This one clock delay serves as a discrete timing "window" in which the priority circuit can take control of the bus by setting the flip-flop 52, as described hereinafter.

The second input to the NAND gate 65 is controlled by the set level from a JK flip-flop 66 which is initially reset by the negative pulse on the RST- line 53. When the flip-flop 66 is set, it enables the output of the NAND gate 65 to go to 0 in response to the resetting of the latches 60 and 64 in the manner described above. If the control flip-flop 66 is not set, the output of the NAND gate 65 cannot go to 0 and the priority condition cannot be passed to the next device. Either of two conditions can set the flip-flop 66, namely, either there has been no local request on the line 42 to set the flip-flop 48, as described above, or the device is already using the bus. The latter condition is indicated by the setting of the flip-flop 52 which causes the output of the NAND gate 54 to go to 0, resulting in a true state being set on the BSY- line 32.

The logic for setting the flip-flop 66 includes a NAND gate 68 whose inputs are derived from the set levels of the flip-flop 48 and reset level of the flip-flop 52. The output of the NAND gate 68 forms one input of a second NAND gate 70 whose other input is derived from the NAND gate 62. The output from the NAND gate 70 together with the set level from the flip-flop 66 form the two inputs to a NOR gate 72, the output of which is connected to the J terminal of the flip-flop 66 for setting the flip-flop in response to a clock pulse. The result is that the flip-flop 66 is set when there is a request condition present on the line 30 (RQ- is true) and the priority in (PIN-) is true, the flip-flop 48 is reset indicating no local request is present, and the flip-flop 52 is reset, indicating the device is not asserting a Busy condition. With the flip-flop 66 set, the NAND gate 65 sets the priority output line 34 to 0, indicating that the POT- is true.

Once one of the devices has asserted a request by making the RQ- line true, all other devices are inhibited from generating a further request until RQ- goes false again. This is provided by a NOR gate 74 whose two inputs are connected respectively to the reset levels of the latches 60 and 64. Initially both of these latches are set by the RST- pulse so that the output of the NOR gate 74 is 1. This output is connected to one input of the NAND gate 44 together with the local request line 42. When either of the latches 60 or 64 is reset, in the manner described above, in response to RQ- and PIN- both being true, the output of the NOR gate 74 goes to 0, thereby preventing the local request at 42 from setting the flip-flop 48 from the output of the NAND gate 44.

When the RQ- line 30 goes true and priority is passed along and received by the device initiating the local request (PIN- is true), if the device is not asserting BSY-, i.e., if the flip-flop 52 is in its reset state, and the BSY- line 32 is false, the device will then proceed to set the flip-flop 52 to signal a busy condition to all of the other devices, preventing assertion of the busy signal in any of the other devices, and at the same time signal the local master device that it has been granted access to the bus.

The flip-flop 52 is set by the next clock pulse after the output of a NOR gate 76 connected to the J input goes to 1. The output of the NOR gate goes to 1 in response to the flip-flop 52 being in the reset state and a NAND gate 78 having all its inputs set to 1. The inputs to the NAND gate 78 include the output of the NAND gate 62, which is set to 1 by the preceeding clock pulse when RQ- and PIN- are both true. A second input to the NAND gate 78 is derived from the set level of the flip-flop 48, indicating that a local request is present. A third input is derived from the output of a NOR gate 80 which goes to 1 only when BSY- is false. To this end, the BSY- line 32 is connected through an inverter 82 to a latch 84 which is initially in the reset state. The set level for the latch 84 is connected to one input of the NOR gate 80 and also to one input of a NOR gate 86 whose output is connected to a second latch 88. The reset level of the latch 88 forms the second input to the NOR gate 80. The output of the inverter 82 is connected to the second input of the NOR gate 86. It will be seen that with the latch 84 initially in the reset state and the latch 88 initially in the set state in response to the negative pulse on the RST- line 53, the output of the NOR gate 80 is set to 1. If the BSY- line goes true, the latch 84 switches to the set state in response to the next clock pulse. As a result the output of the NOR gate 86 goes to 1, causing the latch 88 to be reset by the next clock pulse. Thus a delay is introduced between the time the BSY- line goes false before the device can assert BSY- itself. This protects against transient noise from cancelling the busy status of the bus.

As noted above, once the flip-flop 52 is set and BSY- is asserted by a device having a local request, the flip-flop 48 is reset, thereby removing its assertion of the RQ- signal. At the same time, the setting of the flip-flop 52 allows the flip-flop 66 to be set so that priority can be passed to the next device by setting the POT- level true at the output of the NAND gate 65. This permits priority arbitration to continue while the device is using the bus. The device cannot again reassert RQ- at the output of NAND gate 50 until the Request line 30 again goes false, that is, until all other device requests have been serviced. Once this occurs, the first device in the chain again restarts the priority arbitration sequence since it always has PIN- true by virtue of the closing of switch 40.

Once a device has seized the bus by making BSY- true at the output of the NAND gate 54, no other device can seize the bus. When the device has completed a bus transfer operation, it generates a reset level (Rest Local Request+) on line 92 which causes the flip-flop 52 to be reset so that the BSY- signal again goes false, allowing other devices to gain access to the bus.

To summarize the operation, when no device is requesting access to the bus, only the first in the series connected by the priority line 34 has priority. As soon as one or more of the devices generates a local request, the RQ- line 30 goes true. This causes each device in sequence, starting with the initial device, to pass along a priority signal (POT-) after a one clock delay. The first device in the sequence that has a local request present (flip-flop 48 set) interrupts passing the priority signal on until it generates a busy signal on the BSY- line (flip-flop 52 set) and removes its request signal from RQ- (flip-flop 48 reset). If another device has a local request asserted on the RQ- line, however, priority then continues to be passed along until it is interrupted again by a device along the priority line in which a local request has been initiated. Once the busy signal is removed by the first device (flip-flop 52 is reset), the next device having a local request and having received the priority signal gains access to the bus and sets BSY- to the busy state. It should be noted that once a device has passed along the priority signal, it cannot again assert a request signal on the RQ- line 30 until the RQ- line again goes false, indicating that all pending requests have been serviced. Thus no device can tie up the system by repeated requests for access to the bus. When all requests have been serviced and RQ- goes false, POT- goes false at all the devices and priority starts over again with the initial device.

Thus it will be seen that a modular priority system is provided for a plurality of contending devices that is asynchronous in operation, i.e., the system does not require any information as to the time relationships between different devices. It is not necessary for a device to participate if it does not have a pending request, thereby reducing the overall time required by the system to service all requests for access to the bus.

What is claimed is:

1. In a modular digital data processing system wherein a plurality of master devices communicate with a plurality of slave devices over a common bus, apparatus for resolving priority among the master devices when more than one is seeking access to the bus, comprising: a priority circuit in each device, first and second control conductors connected to each of said circuits, priority conductor means connecting the priority circuits in series starting with a first master device and terminating at a last master device in sequence, means in each device for initiating a local access request signal when access to the bus is required, means responsive to said initiating means for applying a request signal on the first control conductor to each of the priority circuits indicating a request has been initiated, each priority circuit including means responsive to the request signal on the first control conductor and a priority signal received on the priority conductor means from the previous device in the series for generating a control signal, said means generating the control signal including clock means for providing a predetermined fixed delay between the time the request signal on the first control line and the priority signal on the priority conductor are received and the time the control signal indicates they have been received, means responsive to the delayed control signal for sending a priority signal to the next device in series after said predetermined delay, and means responsive to the local request signal and the delayed control signal for applying a busy signal to the second control conductor when a local request is present and the delayed control signal indicates the priority signal has been received.

2. Apparatus of claim 1 further including means in each priority circuit responsive to the presence of a request signal on the first control conductor for inhibiting said means from initiating a local access request while the request signal remains on the first control conductor.

3. Apparatus of claim 2 wherein each priority circuit further includes means responsive to the presence of a busy signal on the second control conductor for inhibiting said means from applying a busy signal to the second control conductor.

4. Apparatus of claim 3 wherein each priority circuit further includes means inhibiting said means sending a priority signal to the next device when a local request is present and a busy signal is present from another priority circuit on the second conductor.

* * * * *